United States Patent [19]

Traino

[11] 4,268,867
[45] May 19, 1981

[54] PIXEL CLOCK FOR SCANNER
[75] Inventor: James C. Traino, Fairport, N.Y.
[73] Assignee: Xerox Corporation, Stamford, Conn.
[21] Appl. No.: 53,604
[22] Filed: Jun. 29, 1979
[51] Int. Cl.³ .................... H04N 1/04; H04N 1/22
[52] U.S. Cl. .................... 358/285; 358/293
[58] Field of Search ............. 358/256, 264, 285, 293, 358/158, 280, 296, 206

[56] References Cited

U.S. PATENT DOCUMENTS

| | | | |
|---|---|---|---|
| 3,240,872 | 3/1966 | Relis et al. | 358/285 |
| 3,479,453 | 11/1969 | Townsend | 358/285 |
| 3,527,375 | 7/1970 | Brouwer | 358/264 |
| 3,532,408 | 10/1970 | Dostal | 350/6 |
| 3,541,248 | 11/1970 | Young | 358/285 |
| 3,566,034 | 2/1971 | Brouwer | 358/293 |
| 3,584,144 | 6/1971 | Shepard et al. | 358/293 |
| 3,629,495 | 12/1971 | Cahill | 358/293 |
| 3,686,437 | 8/1972 | Leonard | 358/293 |
| 3,717,772 | 2/1973 | Engman | 358/113 |
| 3,719,780 | 3/1973 | Gazard et al. | 358/206 |
| 3,731,098 | 5/1973 | Hunt | 358/113 |
| 3,764,192 | 10/1973 | Wheeler | 358/208 |
| 3,800,080 | 3/1974 | Fuwa | 358/293 |
| 3,812,371 | 5/1974 | Chin | 358/285 |
| 3,835,249 | 9/1974 | Dattilo | 358/285 |
| 3,848,087 | 11/1974 | Carrell | 358/264 |
| 3,883,737 | 5/1975 | Throssel et al. | 250/235 |
| 3,931,461 | 1/1976 | Auchere et al. | 358/285 |
| 3,953,859 | 4/1976 | Lolke | 358/292 |
| 3,975,761 | 8/1976 | Taudt et al. | 358/78 |
| 3,999,010 | 12/1976 | Oosaka et al. | 358/307 |
| 4,000,368 | 12/1976 | Tisue | 358/264 |
| 4,002,830 | 1/1977 | Brown et al. | 358/293 |
| 4,032,888 | 6/1977 | Broyles et al. | 358/285 |
| 4,034,400 | 7/1977 | Owen et al. | 358/293 |
| 4,037,231 | 7/1977 | Broyles et al. | 358/293 |
| 4,048,657 | 9/1977 | Knuth | 358/283 |
| 4,070,696 | 1/1978 | Mitchell | 358/293 |
| 4,122,494 | 10/1978 | Levine | 358/293 |
| 4,140,903 | 2/1979 | Clark | 250/236 |

*Primary Examiner*—Joseph A. Orsino, Jr.

[57] ABSTRACT

A clock circuit for clocking video image signals in a raster scanner. The clock circuit includes an inverting gate enabled during scanning with gate output feedback to gate input through an adjustable time delay, the delay inherent in the gate being summed with the delay of the adjustable time delay to provide gate switching and clock output. A register compares clock scan line frequency with preselected scan line resolution and a phase comparator compares scan duration with register output to control clock frequency.

8 Claims, 5 Drawing Figures

PIXEL CLOCK FOR SCANNER

This invention relates to a pixel clock apparatus and method for raster scanning devices of the type employing a moving scanning beam, and more particularly to an improved pixel clock and clock servo control and method for accommodating changes in scanning beam velocity.

In raster output scanning systems of the type employing a scanning beam, sometimes referred to as flying spot scanners, variations in the velocity of the scanning beam or flying spot can cause noticeable registration or alignment errors in the image dots or pixels being produced. While attempts have been made to provide operating components, particularly polygon drive motors, that would assure a constant scanning velocity throughout, such attempts have not been altogether successful, particularly in cases where very high image resolution is desired.

Others have sought to address the problem in other ways and by other means. In one prior art arrangement, the pixel clock, which is used to clock out the video image data to the scanning beam, is held at a fixed frequency. The pixel clock is synchronized with an optically detected start of scan position by, in effect, pulling the pixel clock signal forward into phase with the start of scan signal. This system, however, does not permit servoing of the pixel clock and hence, does not permit pixel clock frequency to be changed in response to changes in scanning beam velocity. As a result, misregistration of the image signals may nevertheless, occur.

This invention relates to a clock circuit for producing pixel clock pulses for use in clocking out video image signals to the scanning beam modulator of a raster imagining device, the imaging device having at least one detector for generating a signal at the start of scan of the scanning beam comprising, in combination: a gate having an inherent operating time delay; the output of the start of scan detector being coupled to one input of the gate; the output of the gate providing pixel clock pulses; a feedback loop coupling the gate output with a second input to the gate to return the pixel clock pulses output by the gate to the gate input; adjustable signal delay means in the feedback loop; the sum of the gate delay and the signal delay means determining oscillation frequency of the clock circuit; and control means for regulating response times of the gate to enable the frequency of the clock circuit to be compensated for variations in scanning beam velocity.

The invention further relates to the method of operating a raster scanner of the type having a scanning beam to illuminate a photosensor in response to image pixel signals to form a latent electrostatic image thereon, with modulator means for controlling exposure of the photosensor by the beam, and clock means for producing pixel clock pulses for clocking image pixel signals to the modulator, the steps which comprise: generating a first signal pulse having a duration that is a function of the time required to process a preselected number of image pixel signals across the scan line at the pixel clock rate of the preceeding line; generating a second signal pulse having a duration that is a function of the interval between start of scan and end of scan; comparing the phase relationship of the first and second signal pulses; and adjusting the output frequency of the clock means to minimize any phase difference between the first and second signals.

Figure 1:
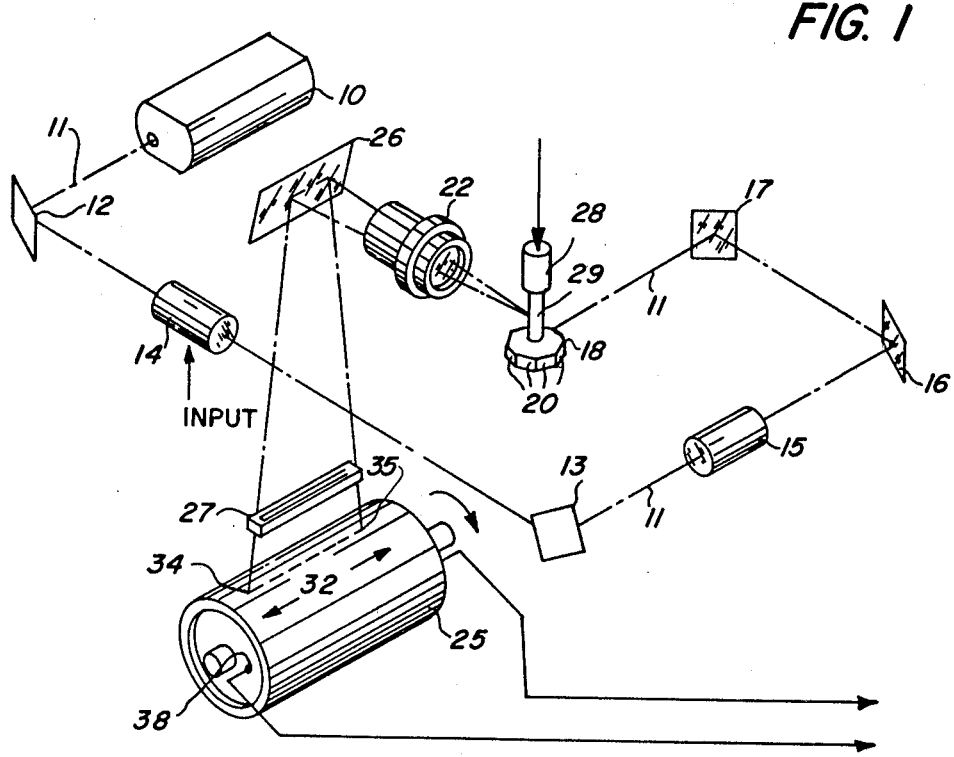
FIG. 1 is an isometric view of an exemplary raster image scanner with which the present invention may be used.
Figure 2:
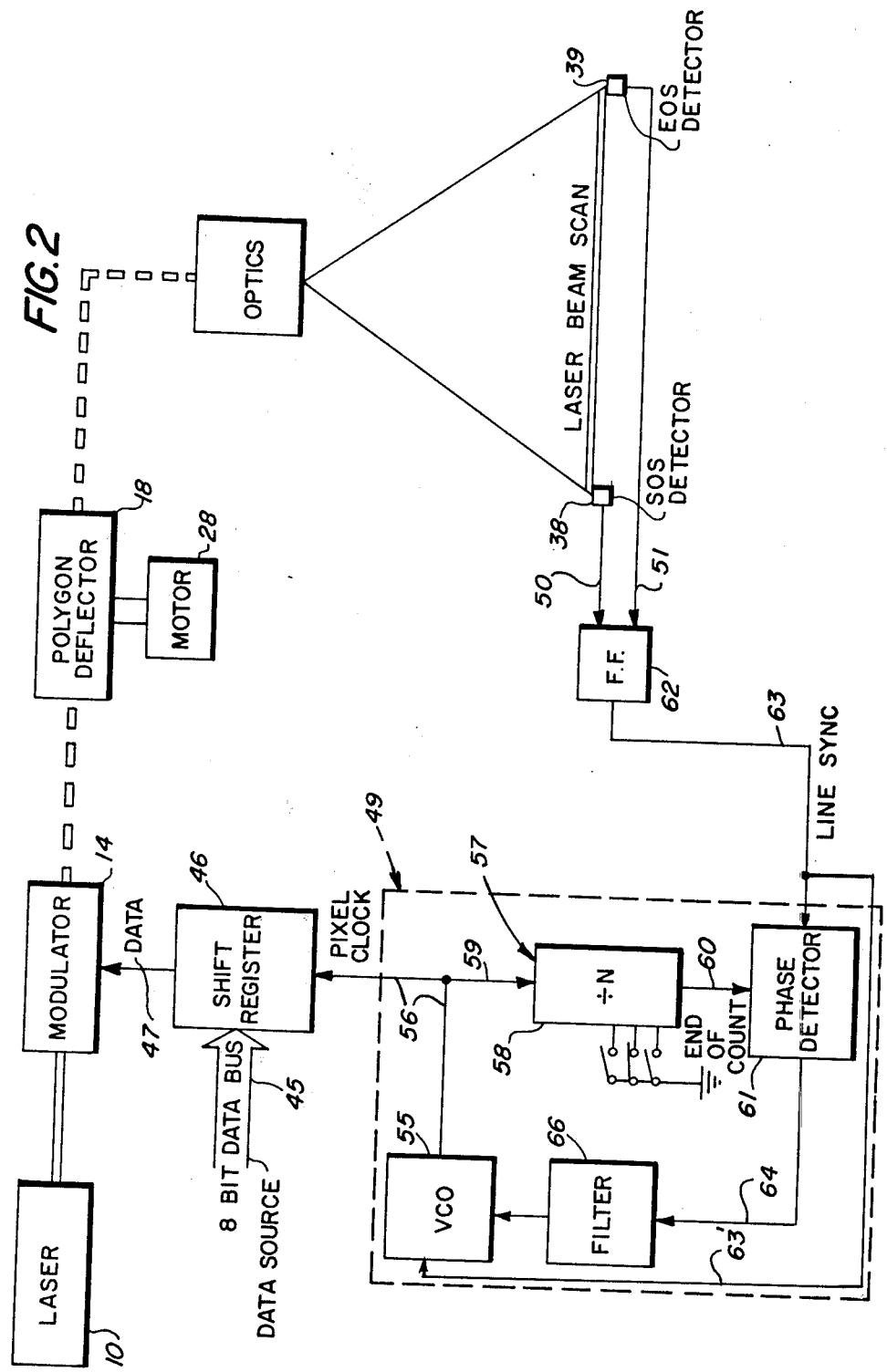
FIG. 2 is a schematic view illustrating the pixel clock control system of the present invention.

Referring to FIGS. 1 and 2, there is shown an exemplary scanning system in which the present invention is adapted for use. An illumination source, which in the exemplary arrangement shown comprises a laser 10 for generating a collimated beam 11 of monochromatic radiation for modulation by modulator 14 in conformance with the information contained in an electrical signal is provided. Beam 11 is reflected by mirror 12 to modulator 14.

Modulator 14 may be any suitable electro optical modulator for imparting video information to beam 11. The modulator 14 may be for example, a Pockel's cell comprising a potassium dihydrogen phosphate crystal, whose index of refraction is periodically varied by the application of the varying voltage which represents the electrical signal. The signal may contain information either by means of binary pulse code modulation or wideband frequency code modulation.

The beam 11 is reflected from a mirror 13 to an astigmatic lens configuration 15. Lens 15 focuses the beam 11 to a controlled energy distribution which is reflected from mirrors 16,17 to impinge upon at least one facet of a scanning polygon 18.

In the preferred embodiment, the rotational axis of polygon 18 is orthogonal to the plane in which light beam 11 travels. The facets 20 of polygon 18 are mirrored surfaces suitable for reflection of any radiated beam impinging upon them. Alternately, flying spot scanning could be provided by any other suitable device such as mirrored piezoelectric crystals or planar reflecting mirrors which are driven in an oscillatory manner.

A lens 22 is located in the optical path between the polygon 18 and the imaging medium which in the exemplary arrangement shown comprises a photoconductive drum 25 of a xerographic reproduction or copying system (not shown). The lens 22 is of a diameter to focus the light beam reflected from facets 26 of polygon 18 to a spot in a focal plane proximate the surface of drum 25 via mirror 26.

Lens 22 provides a linear relationship between the rotating polygon 18 and the deflection of the spot in the traverse direction at the recording medium 25. This linearization by optical means prevents barrel or pincushion-type distortion effects without the need for electrical compensation.

Polygon 18 is continuously driven preferably by a hysteresis synchronous motor 28 through drive shaft 29 with rotation synchronized with a clock signal representative of the desired scanning rate. In the arrangement illustrated, it will be understood that the rate of rotation of drum 25 determines the spacing between successive scan lines. Preferably, cylindrical lens 27 is interposed between mirror 26 and drum 25 to compensate for any misalignment of the optical elements.

As polygon 18 rotates, light beam 11 traces a scan line 32 on the surface of recording medium 25 from point 34

(start of scan or SOS herein) to point 35 (End of scan or EOS herein). Photodectors 38,39 are provided under a transparent portion of the surface of drum 25 detectors 38,39 generating a signal each time light beam 11 reaches point 34 or 35 to provide SOS and EOS signals. As will be understood, the width of the SOS - EOS pulse train (shown in FIG. 5) is dependent upon the velocity at which polygon 18 rotates. Variations in polygon velocity, due for example, to the hunting characteristics of motor 28, is reflected by a change in the width of the pulse generated by detectors 38,39.

As alluded to heretofore, the imaging medium may comprise a xerographic drum 25. As will be understood by those skilled in the xerographic arts, drum 25 rotates consecutively through a charging station whereat a uniform electrostatic charge is applied, an exposure station where imaging beam 11 derived from rotating polygon 18 scans across the drum 25 selectively discharging the charged drum in accordance with the video signal pattern input to modulator 14. The latent electrostatic image formed on drum 25 next passes through a developing station whereat the image is rendered visible by the application of toner. Following development, the image is carried on drum 25 to a transfer station where the developed image is electrostatically transferred to a copy substrate material, typically a sheet of paper. A fusing device fixes the transferred image on the copy paper.

Modulator 14 serves to modulate or vary the intensity of light beam 11 respective to the position of beam 11 within the scan line 32 in accordance with the video signal input. As the spot formed by beam 11 traverses the charged surface of drum 25 through a given scan angle, the spot dissipates electrostatic charge in accordance with its light intensity. The electrostatic charge pattern thus produced is developed in the developing station and transferred to the final copy paper as described.

Following transfer, drum 25 is cleaned by a suitable cleaning device such as a rotating brush. The aforedescribed cycle is repeated for subsequent or additional copies.

Video information in the form of digital signals may be provided through an 8 bit data bus 45 from a suitable source (not shown). In the example shown, data from bus 45 is input to parallel in-serial out shift register 46, the serial output of shift register 46 being coupled to modulator 14 through lead 47. Shift register 46 is driven by clock pulses from pixel clock 49. The SOS and EOS signals generated by detectors 38,39 respectively are input to pixel clock 49 through leads 50,51, flip flop 62, and lead 63.

Figure 3:
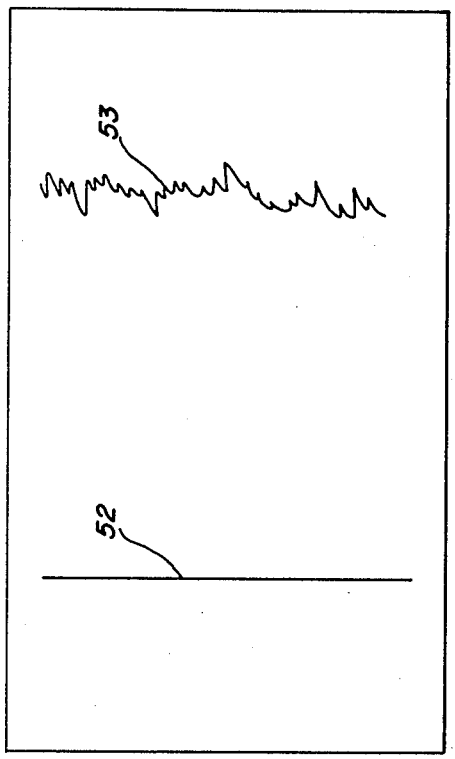
FIG. 3 is a view illustrating the effects on line output of scanning beam velocity variations.

Referring particularly to FIG. 3 of the drawings, if ideal conditions prevailed, the scanning velocity of beam 11 would be constant, permitting the image pixels to be laid down in exact registration with one another to form a straight line 52. However, due to optical and mechanical tolerances inherent in the system, scanning velocity may not be constant across the scan line, resulting in inexact pixel registration. The result is a phenomena described as jitter, an example of which is shown by the scan line 53.

Referring particularly to FIG. 2, pixel clock 49 includes a highly stable gated voltage controlled oscillator (VCO) 55 for generating pixel clock signals, the output of VCO 55 being coupled to shift register 46 through lead 56. To compensate for variations in scanning velocity of beam 11, a servo loop control 57 over VCO 55 is provided. Servo loop control 57 includes a divide by N register 58 phase comparator means in the form of phase detector 61, and low pass filter 66. The pixel clock output of VCO 55 is input to register 58 through lead 59. The output of register 58, termed END OF COUNT herein, is input through lead 60 to phase detector 61.

The output of SOS and EOS detectors 38,39 are input to the set/reset gates of a flip flop 62. THe output of flip flop 62, termed LINE SYNC herein, is input to a second gate of phase detector 61 through lead 63. The control signal output by phase detector 61, the signal strength of which is proportional to the phase relationship between the LINE SYNC and END OF COUNT pulses, the latter representing the pixel clock frequency required to produce a preselected image resolution which is derived from register 58, is input through control line 64 and low pass filter 66 to VCO 55.

Figure 4:
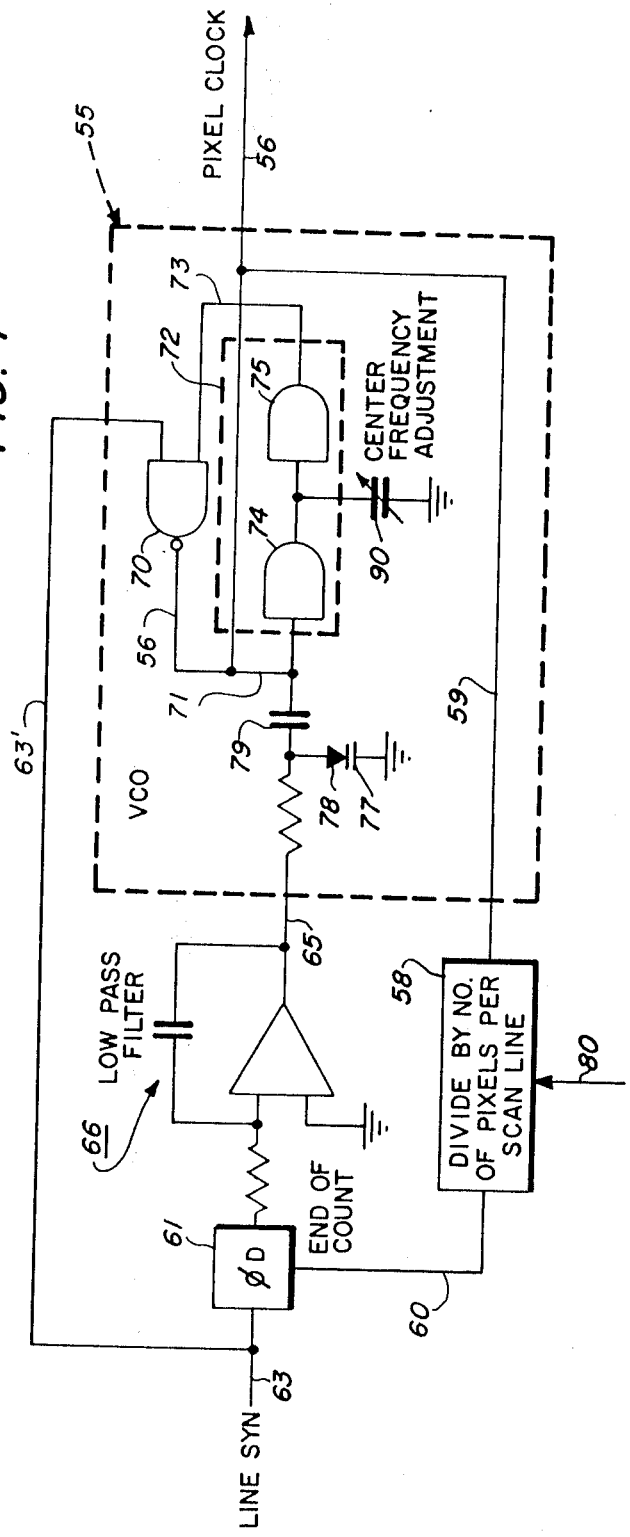
FIG. 4 is a view showing details of the pixel clock circuit of the present invention.

Referring to FIG. 4, VCO 55 includes an inverting logic gate 70. Gate 70 is enabled by the LINE SYNC signal transmitted through lead 63'. Gate 70 serves to provide in output lead 56 thereof the pixel clock signal. Return lead 71 feeds the clock output of gate 70 through a signal delay device 72. The output of delay device 72 is coupled to a second input terminal of gate 70 by lead 73. In the arrangement shown, delay device 72 comprises a pair of series coupled non-inverting gates 74,75. As will be understood, gates 70,74,75 have inherent response delays, designated herein as TD-1, TD-2 and TD-3. As will appear, the maximum frequency of oscillation of VCO 55 is determined by the total loop delay, which is the sum of the response delay of gate 70 (TD-1) and the delays of gates 74,75 (TD-2 plus TD-3).

A series related capacitor/diode 77,78 permit voltage tuning of the frequency of VCO 55 by controlling input rise and fall times of gate 70. Voltage tuning enables the pixel clock frequency to be servo'd to compensate for laser beam velocity variations as will appear. Capacitor 79 provides DC voltage blocking between the control signal input in control lead 65 and VCO 55.

Figure 5:
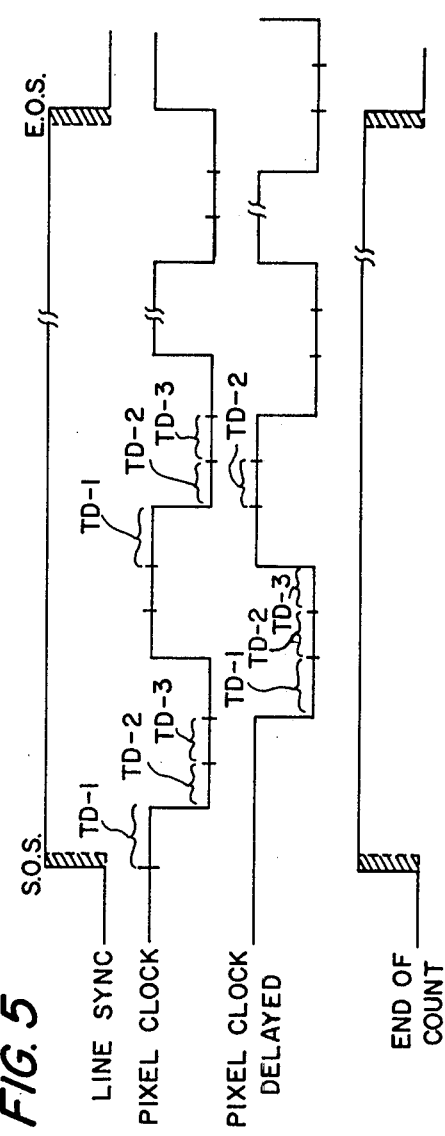
FIG. 5 is a timing chart illustrating operation of the pixel clock circuit of FIG. 4 over a preset interval.

In operation, and referring to FIGS. 4 and 5, on an enabling signal (LINE SYNC) in lead 63', the clock signal output of gate 70 after a delay interval (TD-1) goes low. Following expiration of the timed delay interval introduced by delay device 72 (TD-2 plus TD-3), the length of which is dependent upon the internal characteristics of gates 74,75, the change in signal state (i.e. low) is input to gate 70 via lead 73. The change in input signal, after the delay (TD-1) characteristic of gate 70, triggers gate 70 causing the signal output of gate 70 in lead 56 to go high. The aforedescribed process is repeated to generate in clock lead 56 a pulse-like signal output. As described, the clock pulse output of pixel clock 49 is used to drive shift register 46 controlling timing of image input signals to modulator 14.

At the end of the scan line (EOS) as determined by detector 39, the enabling signal (LINE SYNC) to gate 70 goes low to terminate operation of VCO 55 and stop pixel clock 49.

To compensate for variations in velocity of beam 11, the pixel clock output of VCO 55 is input through lead 59 to divider 58. Divider 58 is preset to the current image resolution expressed for example in pixels per scan line via control lead 80. Divider 58 divides the number of clock pulses generated by VCO 55 in a scan line by the desired image resolution setting, (herein the number of pixels in the scan line) to generate a pixel pulse (END OF COUNT) whose pulse width represents the clock frequency required to provide the selected image resolution at the current velocity of beam 11.

The pixel pulse (END OF COUNT) output by divider 58 is input to phase detector 61 where the pulse width of the pixel pulse (END OF COUNT) in lead 60 is compared with the pulse width of the signal (LINE SYNC) in lead 63 generated by SOS and EOS detectors 38,39 respectively. Where the pulses (END OF COUNT and LINE SYNC) are in phase, the control signal output of phase detector 61 via filter 66 and lead 65 to VCO 55 is zero and no change in the clock output frequency of VCO 55 occurs.

Should the scanning velocity of beam 11 begin to vary, the pulse width of the signal (LINE SYNC) generated by SOS and EOS detectors 38,39 respectively changes. The change in LINE SYNC signal is sensed and a corresponding change in the pixel pulse (END OF COUNT) output by divider 58 occurs to maintain, for the current image resolution setting of divider 58, the requisite number of pixel clock pulses for the scan line. In the case where the scanning velocity of beam 11 increases, the pulse width of the LINE SYNC signal decreases. Where the scanning velocity of beam 11 decreases, the pulse width of the LINE SYNC signal increases.

In response to a change in the pulse width of the LINE SYNC signal, phase detector 61 generates a control signal, having a potential proportional to the degree of change in control lead 65. The control signal passes via filter 66 to voltage tuning capacitor/diode 77,78 which causes either an increase or decrease in the output rise and fall times of inverting gate 70 depending on the control signal change. This effects a corresponding change in the clock output frequency of VCO 55 in accommodation of the change in beam scanning velocity and LINE SYNC pulse width.

Filter 66 in control line 65 includes an op amp 82 with capacitor bypass 83 for filtering out high frequency transients. Variable capacitor 90 permits manual adjustments of the frequency of VCO 55.

While the invention has been described with reference to the structure disclosed, it is not confined to the details set forth, but is intended to cover such modifications or changes as may come within the scope of the following claims:

What is claimed is:

1. A clock circuit for producing pixel clock pulses for use in clocking out video image signals to the scanning beam modulator of a raster imaging device having detector means for generating signals defining start and end of scan of said scanning beam, comprising in combination:
   (a) a clock gate having an inherent operating time delay;
   (b) means to input said start and end of scan signals to one input of said clock gate, the output of said clock gate comprising said pixel clock pulses;
   (c) a feedback loop for feeding pixel clock pulses output by said clock gate to said clock gate input;
   (d) adjustable signal delay means in said feedback loop, the sum of said clock gate time delay and said adjustable signal delay means determining oscillation frequency of said clock gate; and
   (e) control means responsive to changes in velocity of said scanning beam for regulating said adjustable signal delay means to control the frequency of the pixel clock pulses output by said clock gate in response to variations in scanning beam velocity.

2. The clock circuit according to claim 1 in which said control means includes means for generating a first timing pulse reflecting the interval required to process a preselected number of pixels at existing pixel clock pulse frequency;
   means for generating a second timing pulse reflecting the interval between start of scan and end of scan; and
   comparator means for adjusting said pixel clock frequency in response to said first and second timing pulses.

3. The clock circuit according to claim 1 in which said control means includes:
   counter means programmed to a preselected count representing the number of pixels in a scan line;
   a feedback loop for feeding pixel clock pulses output by said clock gate to said counter means,
   said counter means generating an output pulse having a width representative of the time interval required to process said preselected pixel count at existing pixel clock frequency;
   phase comparator means;
   means to feed said counter means output pulse to said phase comparator means;
   means to input a scan pulse having a width defined by start of scan and end of scan signals to said phase comparator means;
   said phase comparator means comparing the phase relation of said counter means output pulse with said scan pulse and generating a phase signal reflecting differences between said pulses; and
   frequency adjusting means for adjusting the response time of said gate and said pixel clock frequency in response to said phase signal.

4. In an imaging device incorporating a raster scanning beam for selectively exposing a charged photoconductive member in response to video image signals, and detector means for generating a start of scan signal at the start of scanning by said beam and an end of scan signal at the end of scanning of said beam, a clock circuit for generating clock signals for clocking said video image signals, comprising:
   (a) a gate having an inherent operating time delay;
   (b) one input to said gate comprising said start of scan signal;
   (c) the output of said gate providing said clock signals;
   (d) a feedback loop to return said clock signals output by said gate to a second input of said gate;
   (e) adjustable signal delay means in said feedback loop;
   (f) the sum of said gate delay and said signal delay means determining the oscillation frequency of said clock circuit; and
   (g) control means for regulating response times of said gate to enable the frequency of said clock signals to be compensated for variations in scanning beam velocity.

5. The method of operating a raster scanner of the type having a scanning beam to illuminate a photosensor in response to image pixel signals to form a latent electrostatic image thereon, with modulator means for controlling exposure of said photosensor by said beam, and clock means for producing pixel clock pulses for clocking image pixel signals to said modulator, the steps of:

(a) generating a first signal pulse having a duration that is a function of the time required to process a preselected number of image pixel signals across the scan line at the pixel clock rate of the preceeding line;

(b) generating a second signal pulse having a duration that is a function of the interval between start of scan and end of scan;

(c) comparing the phase relationship of said first and second signal pulses; and (d) adjusting the output frequency of said clock means to minimize any phase difference between said first and second signal pulses.

6. The method according to claim 5 including the steps of:

clocking out at the pixel clock rate of the preceeding scan line the total number of pixels for the scan line being processed; and measuring the interval required to clock out said pixels to provide said first signal pulse.

7. The method according to claim 5 including the step of changing the biasing level of said clock means in response to a phase difference between said first and second signal pulses to change the frequency of the pixel clock signals produced by said clock means.

8. The method according to claim 5 including the steps of:

enabling a clock gate with a start of scan signal;

feeding back the signal output of said clock gate to said clock gate; and delaying said feedback by a preselected interval to control clock gate output frequency.

* * * * *